(12) United States Patent
Wang

(10) Patent No.: US 11,581,157 B2
(45) Date of Patent: Feb. 14, 2023

(54) SMART SWITCH DEVICE WITH MANUAL CONTROL AND INTELLIGENT CONTROL FUNCTIONS

(71) Applicant: BEIJING XIAOMI MOBILE SOFTWARE CO., LTD., Beijing (CN)

(72) Inventor: Huijun Wang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 209 days.

(21) Appl. No.: 16/686,433

(22) Filed: Nov. 18, 2019

(65) Prior Publication Data

US 2021/0035757 A1    Feb. 4, 2021

(30) Foreign Application Priority Data

Jul. 31, 2019    (CN) .......................... 201910699478.0

(51) Int. Cl.
*H01H 47/00*    (2006.01)
*H02J 50/10*    (2016.01)
(Continued)

(52) U.S. Cl.
CPC .......... *H01H 47/002* (2013.01); *H02J 50/10* (2016.02); *H02J 50/30* (2016.02); *H05B 47/19* (2020.01)

(58) Field of Classification Search
CPC .... H01H 47/002; H01H 47/00; H01H 47/004; H01H 2207/048; H02J 50/10; H02J 50/30; H05B 47/19

(Continued)

(56) References Cited

U.S. PATENT DOCUMENTS 4,355,309 A * 10/1982 Hughey ................. G08C 17/02
                                                                340/9.16
8,410,896 B2    4/2013 Zaveruha
(Continued)

FOREIGN PATENT DOCUMENTS

CN    104749970 A    7/2015
CN    204929345 U    12/2015
(Continued)

OTHER PUBLICATIONS

International Search Report in the international application No. PCT/CN2019/110209, dated Apr. 21, 2020.
(Continued)

*Primary Examiner* — Rexford N Barnie
*Assistant Examiner* — Joseph N Inge
(74) *Attorney, Agent, or Firm* — Syncoda LLC; Feng Ma

(57) ABSTRACT

A switch device includes: a receiving conversion component, configured to receive a wireless signal and convert the received wireless signal into a power supply signal; a first power component, connected to the receiving conversion component, and configured to store electrical energy based on the power supply signal; a control component, connected to the first power component, and configured to enter a working state based on the electrical energy supplied by the first power component, and generate a control signal in the working state; and a first switch component, connected to the control component, and configured to change to be in an on or off state according to the control signal, wherein the first switch component is arranged on a power supply loop of a controlled device to which a second power component is configured to supply electrical energy in the on state.

8 Claims, 13 Drawing Sheets

(51) Int. Cl.
*H02J 50/30* (2016.01)
*H05B 47/19* (2020.01)

(58) Field of Classification Search
USPC ............ 307/115, 104, 66, 64, 149, 129, 117
See application file for complete search history.

(56) References Cited

U.S. PATENT DOCUMENTS

| | | | |
|---|---|---|---|
| 8,491,159 B2* | 7/2013 | Recker | H05B 45/10 362/276 |
| 9,819,230 B2* | 11/2017 | Petras | H02J 50/402 |
| 10,312,697 B1* | 6/2019 | Stieber | H02J 7/0013 |
| 10,601,244 B2* | 3/2020 | Recker | H05B 45/3725 |
| 2003/0160517 A1 | 8/2003 | Lo | |
| 2007/0114967 A1* | 5/2007 | Peng | H02J 7/35 320/101 |
| 2009/0289503 A1* | 11/2009 | Hayashi | H02J 7/0068 320/101 |
| 2014/0064737 A1* | 3/2014 | Chen | G08C 23/04 398/111 |
| 2014/0152251 A1* | 6/2014 | Kim | H02J 50/12 320/108 |
| 2018/0177032 A1* | 6/2018 | Recker | H05B 45/10 |
| 2018/0204696 A1 | 7/2018 | Liu et al. | |
| 2020/0244109 A1* | 7/2020 | Song | H04B 7/15507 |
| 2021/0249890 A1* | 8/2021 | Wang | H02J 50/80 |

FOREIGN PATENT DOCUMENTS

| | | | |
|---|---|---|---|
| CN | 105517299 A | 4/2016 |
| CN | 105825653 A | 8/2016 |
| CN | 206422957 U | 8/2017 |
| CN | 207319433 U | 5/2018 |
| CN | 109062117 A | 12/2018 |
| CN | 109686604 A | 4/2019 |
| EP | 2502354 B1 | 9/2016 |
| EP | 3349547 A1 | 7/2018 |
| JP | 2000324723 A | 11/2000 |
| JP | 2000358203 A | 12/2000 |
| JP | 2002330538 A | 11/2002 |
| JP | 2016512677 A | 4/2016 |
| JP | 2018129160 A | 8/2018 |
| KR | 100604988 B1 | 7/2006 |
| KR | 100728449 B1 | 6/2007 |
| KR | 20090019310 A | 2/2009 |
| KR | 20100020825 A | 2/2010 |
| KR | 101359644 B1 | 2/2014 |
| RU | 2561494 C2 | 8/2015 |
| RU | 2631663 C2 | 9/2017 |
| RU | 2662231 C2 | 7/2018 |
| WO | 2014066272 A1 | 5/2014 |
| WO | 2018184230 A1 | 10/2018 |

OTHER PUBLICATIONS

Supplementary European Search Report in the European application No. 19212623.3, dated Feb. 5, 2020.
Notice of Allowance of the Russian application No. 2019140865, dated Apr. 27, 2020.
First Office Action of the Japanese application No. 2019-563453, dated Nov. 16, 2021.

* cited by examiner

SMART SWITCH DEVICE WITH MANUAL CONTROL AND INTELLIGENT CONTROL FUNCTIONS

CROSS-REFERENCE TO RELATED APPLICATION

This application claims priority to Chinese patent application No. 201910699478.0 filed on Jul. 31, 2019, the disclosure of which is hereby incorporated by reference in its entirety.

BACKGROUND

A smart switch is typically a switch with a wireless control function. The smart switch can be combined with a traditional lamp to make the existing lamp smarter.

SUMMARY

The present disclosure generally relates to the technical field of electronic devices, and more particularly, to a switch device.

A switch device is provided according to an embodiment of the present disclosure. The switch device at least includes:

a receiving conversion component, which is configured to receive a wireless signal and convert the received wireless signal into a power supply signal;

a first power component, which is connected to the receiving conversion component, and is configured to store electrical energy based on the power supply signal;

a control component, which is connected to the first power component, and is configured to enter a working state based on the electrical energy supplied by the first power component, and generate a control signal in the working state; and a first switch component, which is connected to the control component, and is configured to change to be in an on state or an off state according to the control signal, wherein the first switch component is arranged on a power supply loop of a controlled device to which a second power component is configured to supply electrical energy in the on state.

It is to be understood that both the above general description and the following detailed description are exemplary and explanatory only and are not restrictive of the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Typically, a single live wire is usually adopted for home wiring. Various embodiments of the present disclosure can facilitate using power based on the single live wire to supply power to the smart switch.

In a single live wire power mode widely used at present, a single live wire power portion is connected to/with a live wire in series. Since a weak current in a feeding circuit may be passed through a controlled device, a low-power lamp may flicker. Moreover, if a charging solution is adopted, the strong and weak electricity at both ends of the existing power portion cannot be completely isolated, and there is a large charging risk. If a dry battery is directly used to supply power to the smart switch, it will cause frequent battery replacement. If a solar panel is used to supply power to the smart switch, since the switch is usually installed indoors, it is susceptible to an indoor illumination environment.

Figure 1:
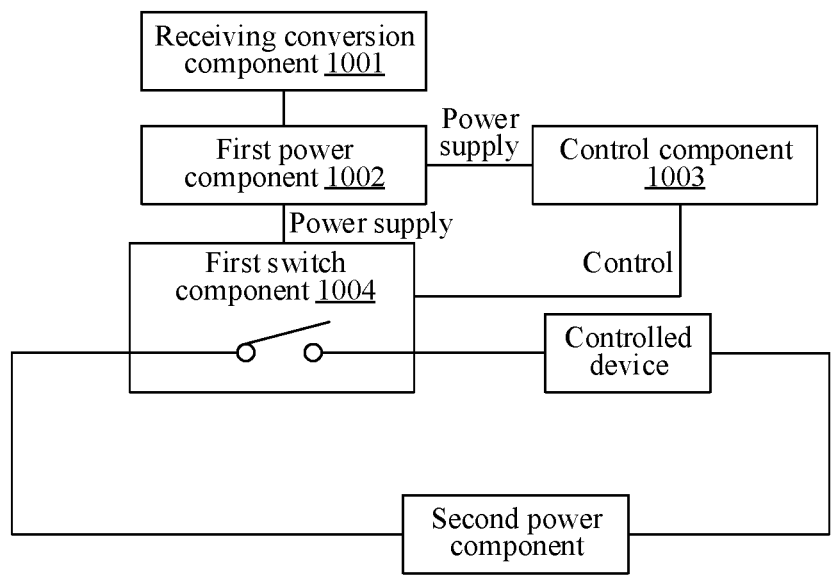
FIG. 1 is a first structure diagram of a switch device according to some embodiments of the present disclosure.

FIG. 1 is a first structure diagram of a switch device according to some embodiments of the present disclosure. As illustrated in FIG. 1, a switch device 1000 at least includes: a receiving conversion component 1001, a first power component 1002, a control component 1003, and a first switch component 1004.

The receiving conversion component 1001 is configured to receive a wireless signal and convert the received wireless signal into a power supply signal.

The first power component 1002 is connected to/with the receiving conversion component, and is configured to store electrical energy based on the power supply signal.

The control component 1003 is connected to the first power component, and is configured to enter a working state based on the electrical energy supplied by the first power component, and generate a control signal in the working state.

The first switch component 1004 is connected to the control component, and is configured to switch/change to be in an on/conducting state or an off/non-conducting state according to the control signal, where the first switch component is arranged on a power supply loop of a controlled device, and a second power component is configured to supply electrical energy/power for/to the controlled device when the first switch component is in the on state.

It should be noted that the switch device 1000 may be a smart switch device, and the on state and the off state of the switch device can be controlled based on the control signal. The control component 1003 may further integrate a communication function, receive a wireless control signal/a wireless signal sent from a control terminal, and upload a current state of the switch to the control terminal according to a preset rule. The preset rule may refer to uploading according to a preset period, or uploading after triggered through a user query instruction. There is no limit here.

In the embodiment of the present disclosure, the receiving conversion component 1001 can convert the wireless signal into the power supply signal. The wireless signal has energy, and the energy of the wireless signal is converted into electrical energy, thereby obtaining the power supply signal.

It should be noted that a wavelength of the wireless signal is different from that of visible light, for example, the wireless signal includes, but is not limited to, an ultraviolet signal, an infrared signal and an electromagnetic signal.

In the embodiment of the present disclosure, the first power component 1002 can store the electrical energy based on the power supply signal and supply the electrical energy to the control component 1003 such that the control component can be in a working state.

Illustratively, the first power component 1002 includes, but is not limited to, a rechargeable component and a capacitor.

In the embodiment of the present disclosure, the control signal generated by the control component 1003 acts on the first switch component 1004 such that the first switch component 1004 can switch its own switch state according to the control signal. The switch state includes the on state and the off state.

Illustratively, the first switch component 1004 includes, but is not limited to, a relay.

In the embodiment of the present disclosure, the first switch component 1004 is arranged on the power supply loop of the controlled device. When the first switch component 1004 is in the on state, the power supply loop is turned on, so that the second power component can supply power to the controlled device through the power supply loop which is turned on. When the first switch component is in the off state, the power supply loop is turned off, so that the second power component cannot supply power to the controlled device through the power supply loop which is turned off. It should be noted that the second power component is configured to supply power to the controlled device.

Illustratively, the second power component includes a mains supply. The controlled device includes a home appliance, for example, the home appliance includes, but is not limited to, a lamp and an air conditioner.

When the controlled device is a lamp, the first switch component 1004 is in the on state, and the second power component supplies power to the controlled device, the lamp is in a working state, that is, the lamp is on. When the first switch component 1004 is in the off state, and the second power component stops supplying power, the lamp is in a non-working state, that is, the lamp is off.

In the embodiment of the present disclosure, the electrical energy is stored based on the power supply signal converted from the wireless signal, and the stored electrical energy is supplied to the control component. Thus, in the first aspect, it is not necessary to supply power to the switch device by using the single live wire, thereby solving the problem of weak current in a small power switch device caused by power supply of a power supply line (for example, the single live wire), so that there is no limit to the power of the controlled device, and it is universal. In the second aspect, power supplies of the switch device and the controlled device are different, and the safety isolation between the weak current and the strong current is realized. In the third aspect, with the use of a wireless signal transmitter, the power supply of the switch device is not affected by an illumination environment, thereby enabling the switch device to be powered more conveniently and quickly. On the other hand, the switch device change the switch state based on the control signal generated by the control component, which can realize the intelligence of the switch device and improve user experience.

In an embodiment, the switch device further includes: a transmitting component for transmitting a wireless signal to the receiving conversion component.

In the embodiment of the present disclosure, the transmitting component may be separately disposed or hidden in the controlled device. Moreover, the frequency at which the transmitting component transmits the wireless signal outward may be set according to actual needs. For example, the transmitting component may be configured to transmit the wireless signal outward in a timed or normally on manner.

Illustratively, when the wireless signal is an ultraviolet signal, the corresponding receiving conversion component 1001 may be an ultraviolet receiving component, and the corresponding transmitting component may be an ultraviolet transmitting component. When the wireless signal is an infrared signal, the corresponding receiving conversion component 1001 may be an infrared receiving component, and the corresponding transmitting component may be an infrared transmitting component. When the wireless signal is an electromagnetic signal, the corresponding receiving conversion component 1001 may be an electromagnetic signal receiving component, and the corresponding transmitting component may be an electromagnetic signal transmitting component.

Figure 2:
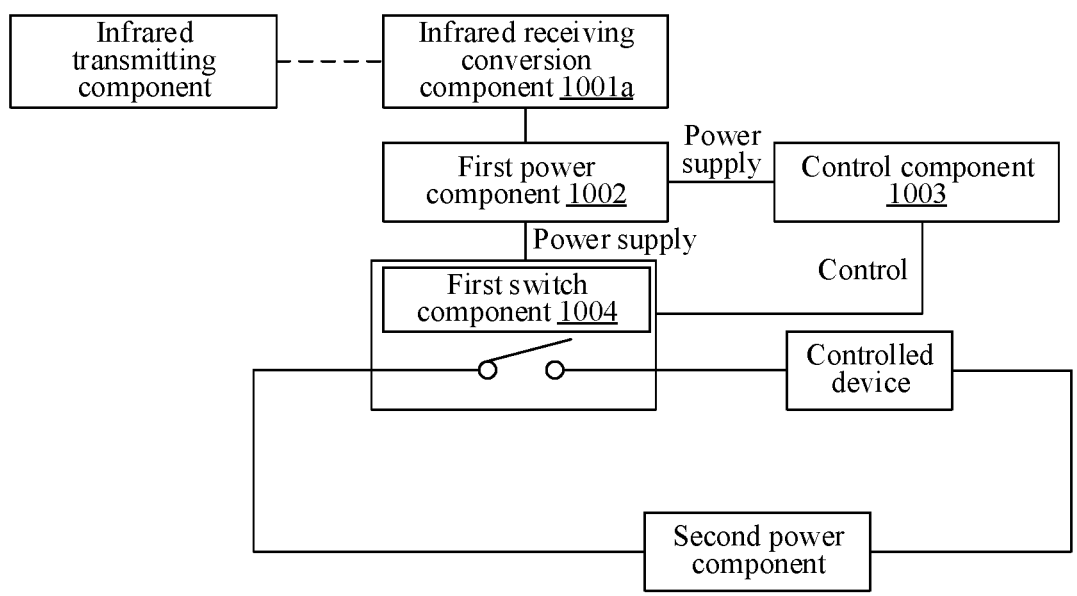
FIG. 2 is a second structure diagram of a switch device according to some embodiments of the present disclosure.
Figure 3:
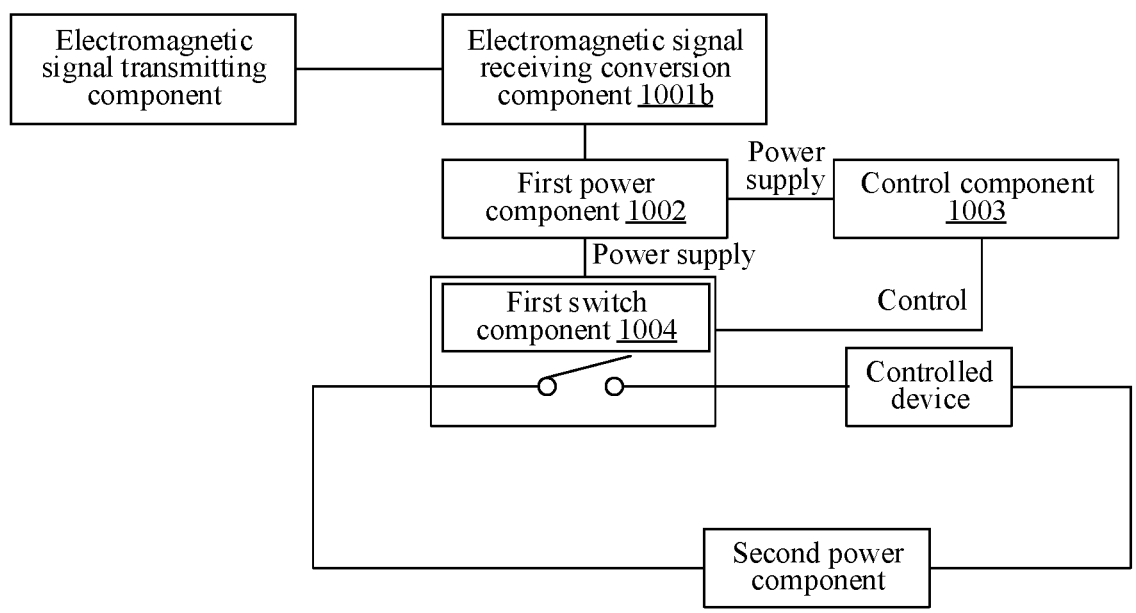
FIG. 3 is a third structure diagram of a switch device according to some embodiments of the present disclosure.

In an embodiment, as illustrated in FIG. 2 and FIG. 3, when the transmitting component is an infrared transmitting component, the receiving conversion component 1001 includes: an infrared receiving conversion component 1001a for receiving an infrared signal.

When the transmitting component is an electromagnetic signal transmitting component, the receiving conversion component 1001 includes: an electromagnetic signal receiving conversion component 1001b for receiving an electromagnetic signal.

In the embodiment of the present disclosure, the receiving conversion component 1001 includes an infrared receiving conversion component 1001a and an electromagnetic signal receiving conversion component 1001b.

When the receiving conversion component 1001 is the infrared receiving conversion component 1001a, the corresponding transmitting component includes an infrared transmitting component. When the receiving conversion component 1001 is the electromagnetic signal receiving conversion component 1001b, the corresponding transmitting component includes an electromagnetic signal transmitting component.

It should be noted that the infrared transmitting component is configured to transmit an infrared signal. The electromagnetic signal transmitting component is configured to transmit an electromagnetic signal.

Illustratively, the infrared transmitting component includes, but is not limited to, an infrared transmitter and a laser diode. The electromagnetic signal transmitting component includes, but is not limited to, a current coil.

Figure 4:
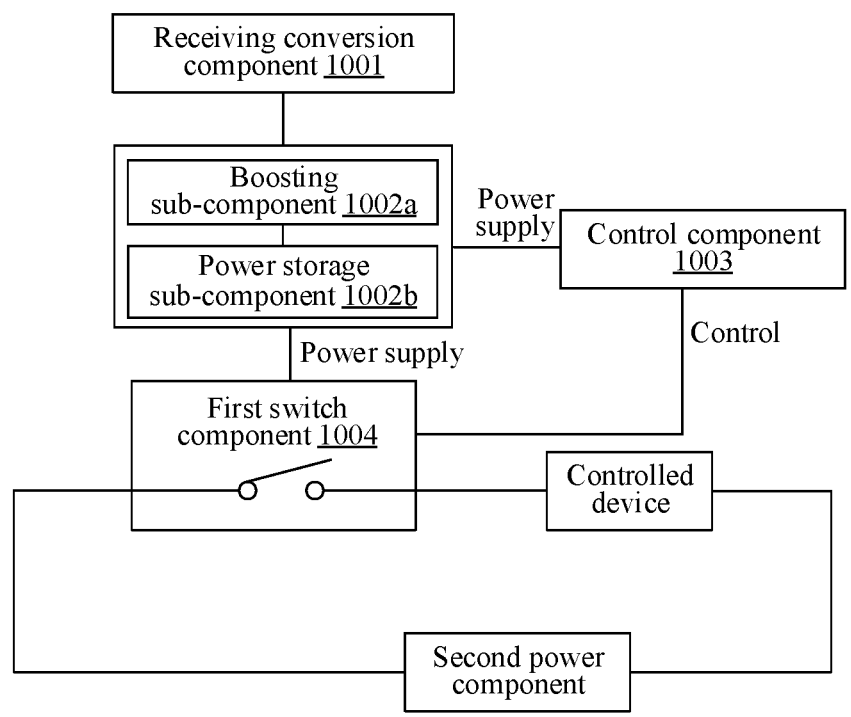
FIG. 4 is a fourth structure diagram of a switch device according to some embodiments of the present disclosure.

In an embodiment, as illustrated in FIG. 4, the first power component 1002 includes a boosting sub-component 1002a and a power storage sub-component 1002b.

The boosting sub-component 1002a is connected to the receiving conversion component, and is configured to boost a power supply signal.

The power storage sub-component 1002b is connected to the boosting sub-component, and is configured to store electrical energy based on the boosted power supply signal and supply power to the control component based on the electrical energy.

In the embodiment of the present disclosure, the boosting sub-component 1002a is configured to supply power to the power storage sub-component based on the boosted power supply signal.

Illustratively, the boosting sub-component 1002a includes, but is not limited to, a bootstrap boost diode and a bootstrap boost capacitor.

In the embodiment of the present disclosure, the power storage sub-component 1002b can store the electrical energy based on the boosted power supply signal.

It should be noted that the power storage sub-component 1002b may be used as a power supply to supply power to other electrical components in the switch device.

Illustratively, the power storage sub-component 1002b includes, but is not limited to, a rechargeable battery and a capacitor. Other electrical components include, but are not limited to, a first switch component and a control component.

Figure 5:
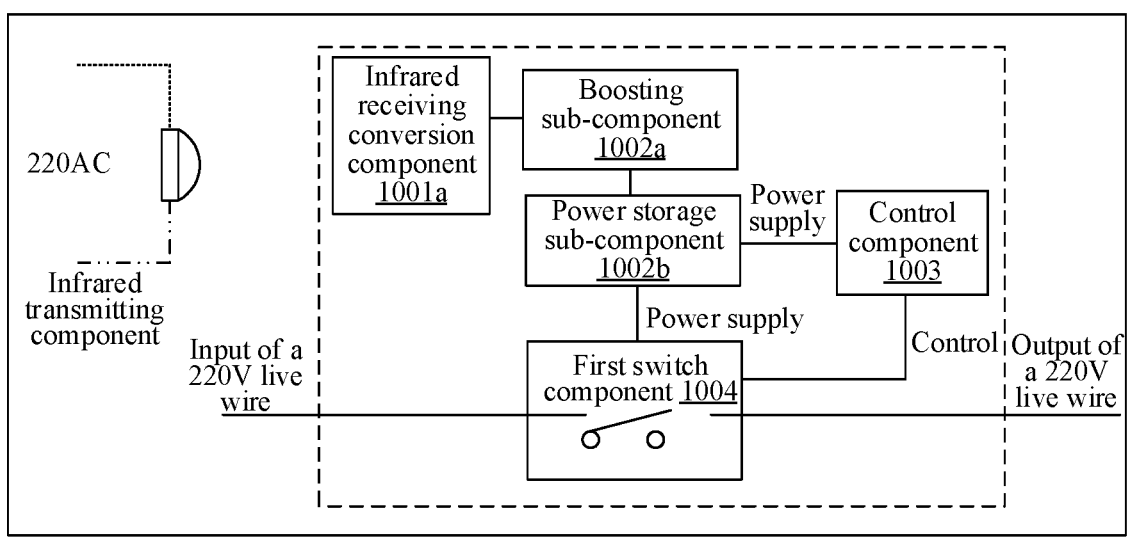
FIG. 5 is a fifth structure diagram of a switch device according to some embodiments of the present disclosure.

As illustrated in FIG. 5, the infrared transmitting component transmits an infrared signal, and the infrared receiving conversion component 1001a receives the infrared signal, converts the infrared signal into a power supply signal, and outputs the power supply signal to the boosting sub-component 1002a. The boosting sub-component 1002a is configured to boost the power supply signal, and output the boosted power supply signal to the power storage sub-component 1002b. The power storage sub-component 1002b stores electrical energy based on the boosted power supply signal and supplies power to the control component 1003 and the first switch component 1004 based on the electrical energy.

Figure 6:
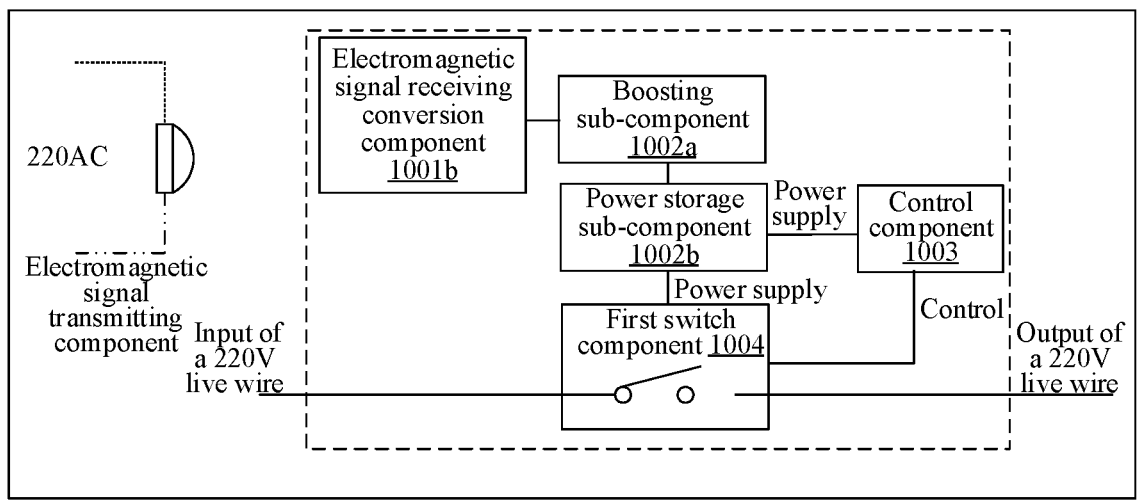
FIG. 6 is a sixth structure diagram of a switch device according to some embodiments of the present disclosure.

As illustrated in FIG. 6, an electromagnetic signal transmitting component transmits an electromagnetic signal; the electromagnetic signal receiving conversion component 1001b receives the electromagnetic signal, converts the electromagnetic signal into a power supply signal, and outputs the power supply signal to the boosting sub-component 1002a. The boosting sub-component 1002a is configured to boost the power supply signal, and output the boosted power supply signal to the power storage sub-component 1002b. The power storage sub-component 1002b stores electrical energy based on the boosted power supply signal and supplies power to the control component 1003 and the first switch component 1004 based on the electrical energy.

The first switch component 1004 is arranged on the loop of the controlled device. Specifically, both ends of the first switch component 1004 are respectively input and output of a 220V live wire.

In an embodiment, as illustrated in FIG. 7, the switch device 1000 further includes a second switch component 1005.

The second switch component 1005 is disposed in series with the first switch component 1004 on the power supply loop, and is connected to the first switch component 1004 and the control component 1003 respectively.

The second switch component 1005 is configured to switch a switch state according to a user operation on the second switch component 1005.

The control component 1003 is configured to output a control signal to the first switch component 1004 according to the switch state of the second switch component 1005 and a wireless control signal including a user instruction.

In the embodiment of the present disclosure, the power supply loop may be a loop that is mutually cooperatively communicated by the first switch component 1004 and the second switch component 1005. The second switch component 1005 and the first switch component 1004 are connected in series on the power supply loop. The user operation on the second switch component 1005 can change the power supply state of the second power component in the power supply loop. That is to say, a user can directly perform manual control on the second switch component 1005, and an intelligent control can also be implemented through the first switch component 1004 based on the control signal generated by the control component.

It should be noted that, when the second switch component 1005 is in an on state, the second power component in the power supply loop supplies power to the controlled device. When the second switch component 1005 is in an off state, the second power component in the power supply loop stops supplying power to the controlled device.

In an implementation manner provided by an embodiment of the present disclosure, the second switch component 1005 includes, but is not limited to, a single-pole single-throw switch. A single live wire wireless control switch in the related art is serially connected to a live wire, and the wireless control switch is powered by collecting a live wire voltage difference current.

Figure 7A:
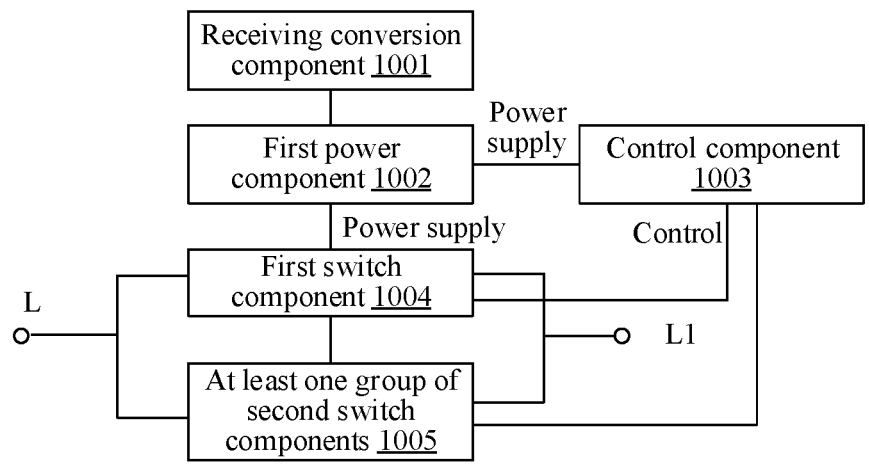
FIG. 7A is a seventh structure diagram of a switch device according to some embodiments of the present disclosure.

FIG. 7A is a structure diagram of a switch device in the related art. A switch device includes a control component 1003. The control component 1003 may be a micro control portion with a wireless communication function. The control component 1003 includes a pin VCC and a pin GND for power supply, an input pin S1, an output pin S2, and an output pin S3.

The control component 1003 is connected to a fixed sub-end B1 of the second switch component 1005 through the input pin S1. The second switch component 1005 further includes a fixed sub-end A1. The fixed sub-end A1 is connected to power VDD, and a moving sub-end for connecting or disconnecting is provided between the fixed sub-end A1 and the fixed sub-end B1. When the moving sub-end connects the fixed sub-end A1 and the fixed sub-end B1, a high (electrical) level of the power is sent to the control component 1003 through the pin S1.

The output pin S2 and the output pin S3 of the control component 1003 are connected to an input pin of the first switch component 1004. The fixed sub-end A2 of the first switch component 1004 is connected to a first connection point L, and the fixed sub-end B2 is connected to a second connection point L1. The first connection point L is connected to the live wire, and the second connection point L1 is connected to the controlled device.

A feeding circuit is further disposed in series between the first connection point L and the second connection point L1, and an output end of the feeding circuit is connected to the pin VCC and the pin GND. The feeding circuit is configured to supply power to the control component 1003.

In a wireless control mode, when the control component 1003 controls the moving sub-end of the first switch component 1004 to connect the fixed sub-end A2 and the fixed sub-end B2, the controlled device is in a working state. The control component 1003 controls the moving sub-end in the first switch component 1004 to disconnect the fixed sub-end A2 and the fixed sub-end B2, and the controlled device is in a non-working state.

In a manual control mode, when the fixed sub-end A1 and the fixed sub-end B1 of the second switch component 1005 are turned on, the pin S1 of the control component 1003 detects a high level signal, and the control component 1003 controls the moving sub-end of the first switch component 1004 to connect the fixed sub-end A2 and the fixed sub-end B2 through the output pin S2 and the output pin S3, thereby controlling the controlled device to be energized. When the fixed sub-end A1 and the fixed sub-end B1 of the second switch component 1005 are disconnected, the pin S1 of the control component 1003 detects that the high level signal is changed to a low level state, and the control component 1003 controls the moving sub-end of the first switch component 1004 to disconnect the fixed sub-end A2 and the fixed sub-end B2 through the output pin S2 and the output pin S3, thereby controlling the controlled device to be de-energized to stop working.

Figure 7B:
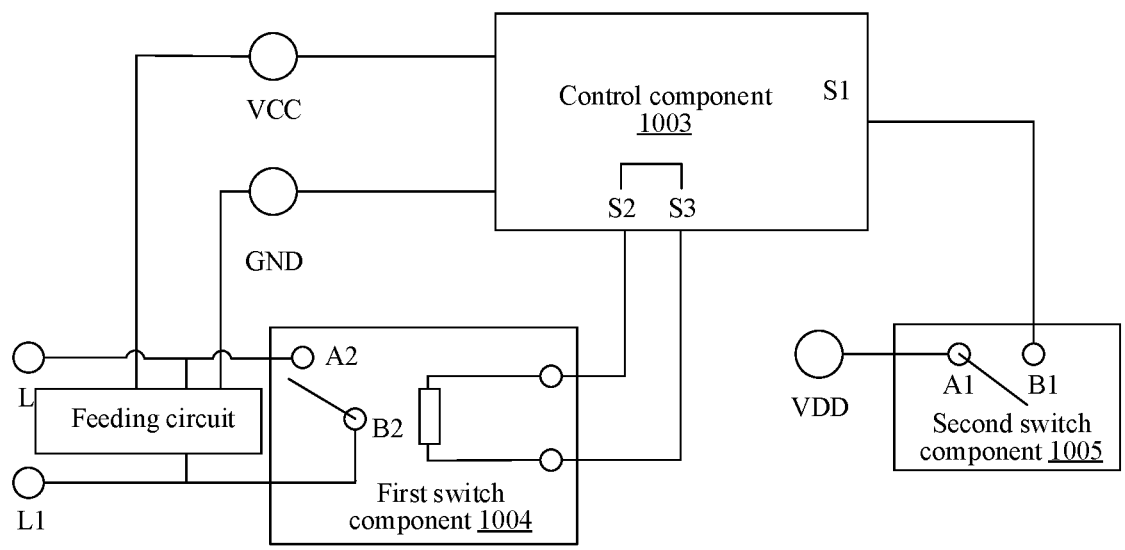
FIG. 7B is a structure diagram of a switch device according to some embodiments of the present disclosure.

As the first switch component 1004 in FIG. 7B may need to communicate two connection points, the two connection points are access terminals for connecting in series with the live wire, and the two connection points include the first connection point L and the second connection point L1. The feeding circuit supplies power to the control component 1003 to result in a weak current in the circuit. For example, the controlled device is an electric lamp. In the state of turning off the lamp, there is a weak current in naught and live wires in the circuit, which causes the electric lamp to flicker. A wireless control switch of a certain type is taken as an example. Due to the principle of serial feeding power, the minimum power of the lamp is also required. The common lamp power needs to be greater than 3 W. Since the power consumption of the first switch component 1004 of the wireless control switch is not too high, the total power needs to be less than 1500 W.

Figure 7C:
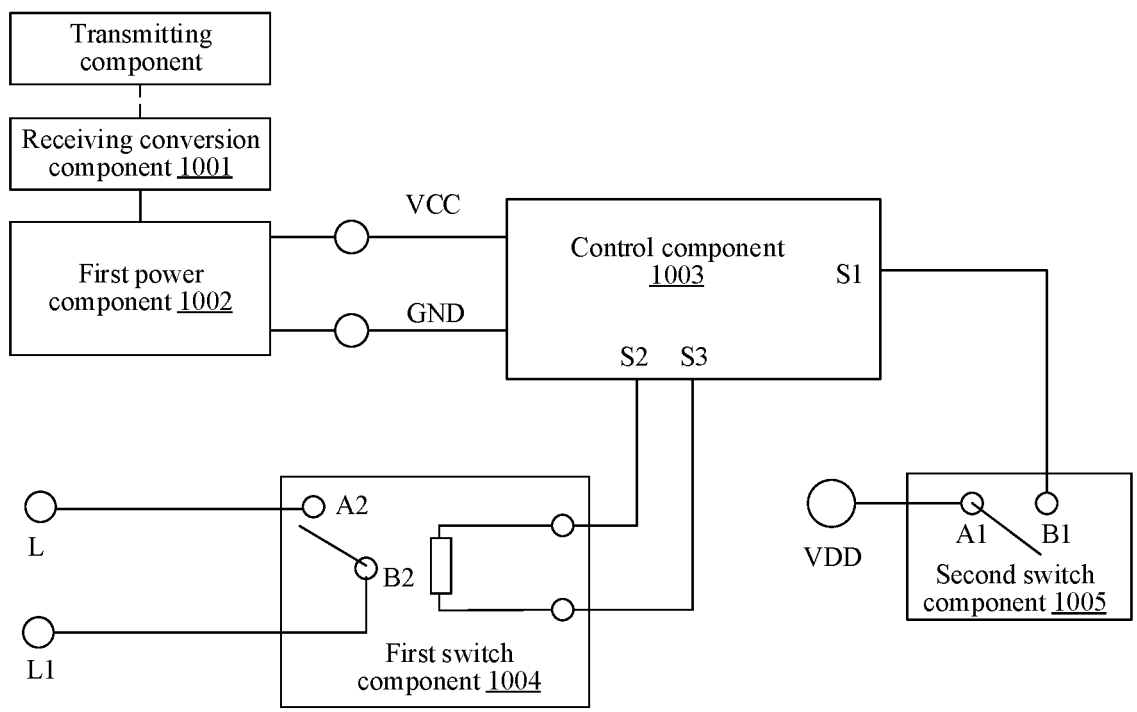
FIG. 7C is a structure diagram of a switch device according to some embodiments of the present disclosure.

FIG. 7C is a structure diagram of a switch device illustrated in FIG. 7B after adopting a switch device solution provided by an embodiment of the present disclosure. As illustrated in FIG. 7C, the control component 1003 is connected to the first power component 1002, and the first power component 1002 is connected to the receiving conversion component 1001. The transmitting component transmits a wireless signal to the receiving conversion component 1001. The receiving conversion component 1001 receives the wireless signal, and converts the wireless signal into a power supply signal. The first power component 1002 stores electrical energy based on the power supply signal, and supplies the electrical energy to the control component 1003.

In the embodiment of the present disclosure, in a wireless control mode, the control component 1003 controls the first switch component 1004 to be in an on state or an off state according to the received wireless control signal. When the first switch component 1004 is in the on state, the controlled device is in a working state. When the first switch component 1004 is in the off state, the controlled device is in a non-working state.

In a manual control mode, the control component 1003 detects a switch state of the second switch component 1005 through the pin S1. Based on the switch state of the second switch component 1005, the control component 1003 controls a switch state of the first switch component 1004 through the output pin S2 and the output pin S3. When the fixed sub-end A1 and the fixed sub-end B1 of the second switch component 1005 are connected, the control component 1003 controls the moving sub-end of the first switch component 1004 to connect the fixed sub-end A2 and the fixed sub-end B2 through the output pin S2 and the output pin S3, thereby controlling the controlled device to be energized. When the fixed sub-end A1 and the fixed sub-end B1 of the second switch component 1005 are disconnected, the control component 1003 controls the moving sub-end of the first switch component 1004 to disconnect the fixed sub-end A2 and the fixed sub-end B2 through the output pin S2 and the output pin S3, thereby controlling the controlled device to be de-energized to stop working.

It can be understood that, in the embodiments of the present disclosure, the electrical energy is stored based on the power supply signal converted from the wireless signal, and the stored electrical energy is supplied to the control component. Thus, in the first aspect, it is not necessary to supply power to the switch device by using the single live wire, thereby solving the problem of weak current in a small power switch device caused by power supply of a power supply line (for example, the single live wire), so that there is no limit to the power of the controlled device, and it is universal. In the second aspect, power supplies of the switch device and the controlled device are different, and the safety isolation between the weak current and the strong current is realized. In the third aspect, the wireless signal is transmitted by the transmitting component, and the power supply of the switch device is not affected by an illumination environment, thereby enabling the switch device to be powered more conveniently and quickly.

Figure 8A:
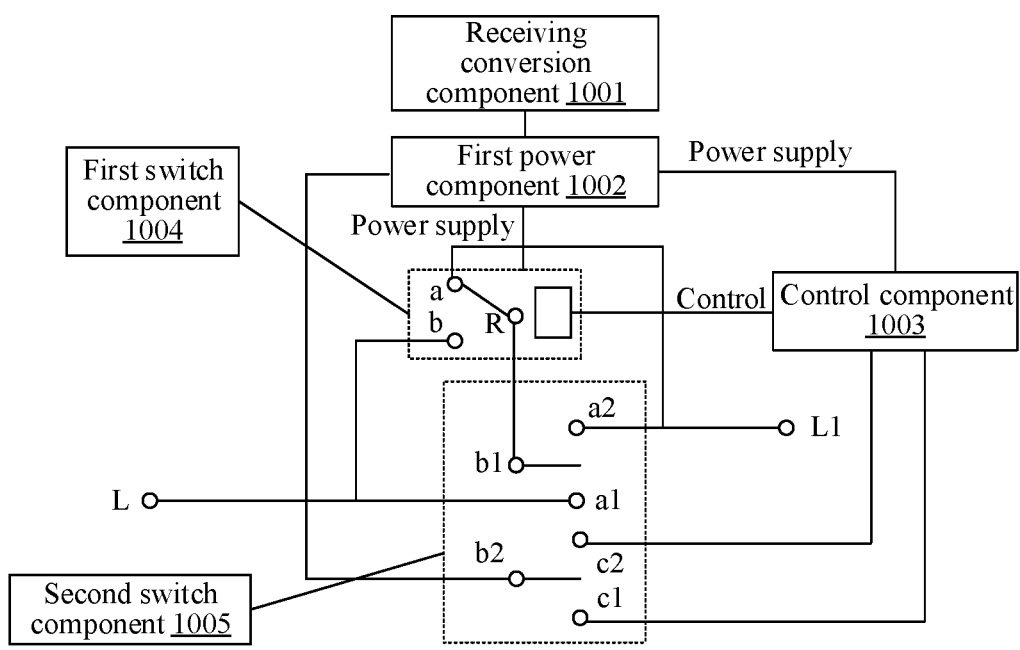
FIG. 8A is an eighth structure diagram of a switch device according to some embodiments of the present disclosure.

In another implementation manner provided by an embodiment of the present disclosure, the second switch component 1005 includes, but is not limited to, a double-pole double-throw switch. As illustrated in FIG. 8A, the second switch component 1005 includes: a first moving sub-end b1 and a second moving sub-end b2.

The first moving sub-end b1 is connected to a moving end R of the first switch component 1004.

The second moving sub-end b2 is connected to the first power component 1002.

The first moving sub-end b1 and the second moving sub-end b2 have identical switch states.

In an embodiment, as illustrated in FIG. 8A, the second switch component 1005 further includes: a fixed sub-end a1, a second fixed sub-end a2, a third fixed sub-end c1, and a fourth fixed sub-end c2.

The first fixed sub-port a1 cooperates with the first moving sub-end b1 and is connected to the first connection point L.

The second fixed sub-port a2 cooperates with the first moving sub-end b1 and is connected to the second connection point L1.

The third fixed sub-end c1 cooperates with the second moving sub-end b2 and is connected to the control component 1003.

The fourth fixed sub-end c2 cooperates with the second moving sub-end b2 and is connected to the control component 1003.

It should be noted that the first moving sub-end b1 and the second moving sub-end b2 having identical switch states refers to that: when the first moving sub-end b1 is connected to the second fixed sub-end a2, the second moving sub-end b2 is connected to the fourth fixed sub-end c2; and when the first moving sub-end b1 is connected to the first fixed sub-end a1, the second moving sub-end b2 is connected to the third fixed sub-end c1.

In an embodiment, as illustrated in FIG. 8A, the first switch component 1004 includes: the moving end R, a fifth fixed sub-end a and a sixth fixed sub-end b. The fifth fixed sub-end a and the sixth fixed sub-end b respectively cooperate with the moving end R. The fifth fixed sub-end a is connected to the second connection point L1, and the sixth fixed sub-end b is connected to the first connection point L.

In an embodiment, as illustrated in FIG. 8A, the control component 1003 is configured to generate a first control signal when the wireless control signal represents turn-on control between the first connection point L and the second connection point L1 and the second moving sub-end b2 is connected to the third fixed sub-end c1. The first control signal is used for controlling the moving end R of the first switch component 1004 to be connected to the fifth fixed sub-end a.

A second control signal is generated when the wireless control signal represents turn-off control between the first connection point L and the second connection point L1 and the second moving sub-end b2 is connected to the third fixed sub-end c1. The second control signal is used for controlling the moving end R of the first switch component 1004 to be connected to the sixth fixed sub-end b.

A third control signal is generated when the wireless control signal represents turn-on control between the first connection point L and the second connection point L1 and the second moving sub-end b2 is connected to the fourth fixed sub-end c2. The third control signal is used for controlling the moving end R of the first switch component 1004 to be connected to the sixth fixed sub-end b.

A fourth control signal is generated when the wireless control signal represents turn-off control between the first connection point L and the second connection point L1 and the second moving sub-end b2 is connected to the fourth fixed sub-end c2. The fourth control signal is used for controlling the moving end R of the first switch component 1004 to be connected to the fifth fixed sub-end a.

It should be noted that the second switch component 1005 can be used to manually control the on state or the off state of the switch device, and the first switch component 1004 can control the on state or the off state of the switch device according to the switch state of the second switch component 1005 and the wireless control signal. FIG. 8A only illustrates an example, and a connection relationship and a control relationship between the first switch component 1004 and the second switch component 1005 are not limited in the present disclosure.

For example, the controlled device is an electric lamp, and the electric lamp is controlled to be turned on or off. The switch device in the present embodiment includes two working modes, which are respectively a wireless control mode through the first switch component 1004 and a manual control mode through the second switch component 1005.

In the wireless control mode, the control component 1003 receives a wireless control signal from a device such as a mobile phone or a remote controller, and the wireless control signal may be a on or off signal. When the wireless control signal is the on signal, the control component 1003 first detects a current switch state of the second switch component 1005 (e.g., the double-pole double-throw switch) according to signals at the third fixed sub-end c1 and the fourth fixed sub-end c2. When the second moving sub-end b2 is connected to the third fixed sub-end c1, the control component 1003 controls the moving end R of the first switch component to be connected to the fifth fixed sub-end a, and at this time, the circuit between the two connection points L and L1 is turned on, and the electric light is turned on. When the second moving sub-end b2 is connected to the fourth fixed sub-end c2, the control component 1003 controls the moving end R of the first switch component to be connected to the sixth fixed sub-end b, and at this time, the circuit between the two connection points L and L1 is turned on, and the electric light is turned on.

In the wireless control mode, when the wireless control signal is the off signal, the control component 1003 first detects a current switch state of the second switch component 1005 (e.g., the double-pole double-throw switch). When the second moving sub-end b2 is connected to the third fixed sub-end c1, the control component 1003 controls the moving end R of the first switch component to be connected to the sixth fixed sub-end b, and at this time, the circuit between the two connection points L and L1 is turned off, and the electric light is turned off. When the second moving sub-end b2 is connected to the fourth fixed sub-end c2, the control component 1003 controls the moving end R of the first switch component to be connected to the fifth fixed sub-end a, and at this time, the circuit between the two connection points L and L1 is turned off, and the electric light is turned off.

In the manual control mode, when the moving end R is connected to the fixed sub-end a, the second switch component 1005 is manually controlled, the first moving sub-end b1 and the first fixed sub-end a1 are connected to be in a on state, and the first moving sub-end b1 and the second fixed sub-end a2 are connected to be in an off state.

In the manual control mode, when the moving end R is connected to the fixed sub-end b, the second switch component 1005 is manually controlled, the first moving sub-end b1 and the second fixed sub-end a2 are connected to be in the on state, and the first moving sub-end b1 and the first fixed sub-end a1 are connected to be in the off state.

It should be noted that FIG. 8A only illustrates an example, and the number of the first switch components 1004, the number of the second switch components 1005, and the connection manner therebetween are not limited.

Figure 8B:
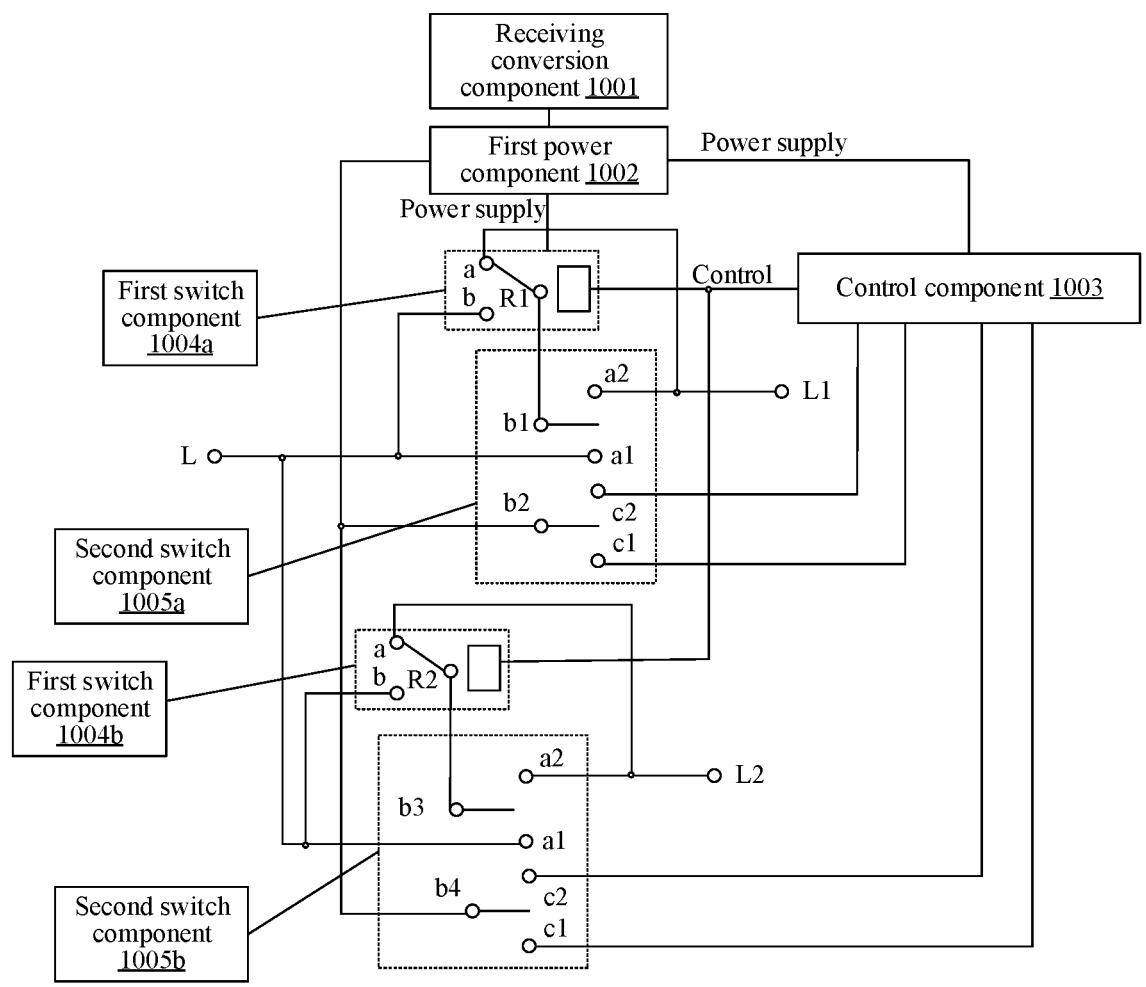
FIG. 8B is a ninth structure diagram of a switch device according to some embodiments of the present disclosure.

In an embodiment, as illustrated in FIG. 8B, the switch device includes at least two power supply loops disposed in parallel, each power supply loop includes the first switch component 1004 and the second switch component 1005.

The switch device of the embodiment of the present disclosure will be described below by taking two power supply loops as an example. As illustrated in FIG. 8B, the first power supply loop is a power supply loop formed by the first connection point L and the second connection point L1, and the second power supply loop is a power supply loop formed by the first connection point L and a third connection point L2.

The first power supply loop includes a first switch component 1004a and a second switch component 1005a. Fixed sub-ends a and b of the first switch component 1004a are connected to the second connection point L1 and the first connection point L, respectively. A moving end R1 of the first switch component 1004a is connected to a moving sub-end b1 of the second switch component 1005a. Two fixed sub-ends a1 and a2 of the second switch component 1005a are connected to the first connection point L and the second connection point L1, respectively. Two fixed sub-ends c1 and c2 of the second switch component 1005a are connected to the control component 1003, respectively. A moving sub-end b2 of the second switch component is connected to the first power component 1002.

The second power supply loop includes a first switch component 1004b and a second switch component 1005b. Fixed sub-ends a and b of the first switch component 1004b are connected to the third connection point L2 and the first connection point L, respectively. A moving end R2 of the first switch component 1004b is connected to a moving sub-end b3 of the second switch component 1005b. Two fixed sub-ends a1 and a2 of the second switch component 1005b are connected to the first connection point L and the third connection point L2, respectively. Two fixed sub-ends c1 and c2 of the second switch component 1005b are connected to the control component 1003, respectively. A moving sub-end b4 of the second switch component is connected to the first power component 1002.

It can be understood that the switch device can control the on state or the off state of a first controlled device arranged on the first power supply loop through the first switch component 1004a and the second switch component 1005a on the first power supply loop, and can also control the on state or the off state of a second controlled device arranged on the second power supply loop through the first switch component 1004b and the second switch component 1005b on the second power supply loop.

Figure 9:
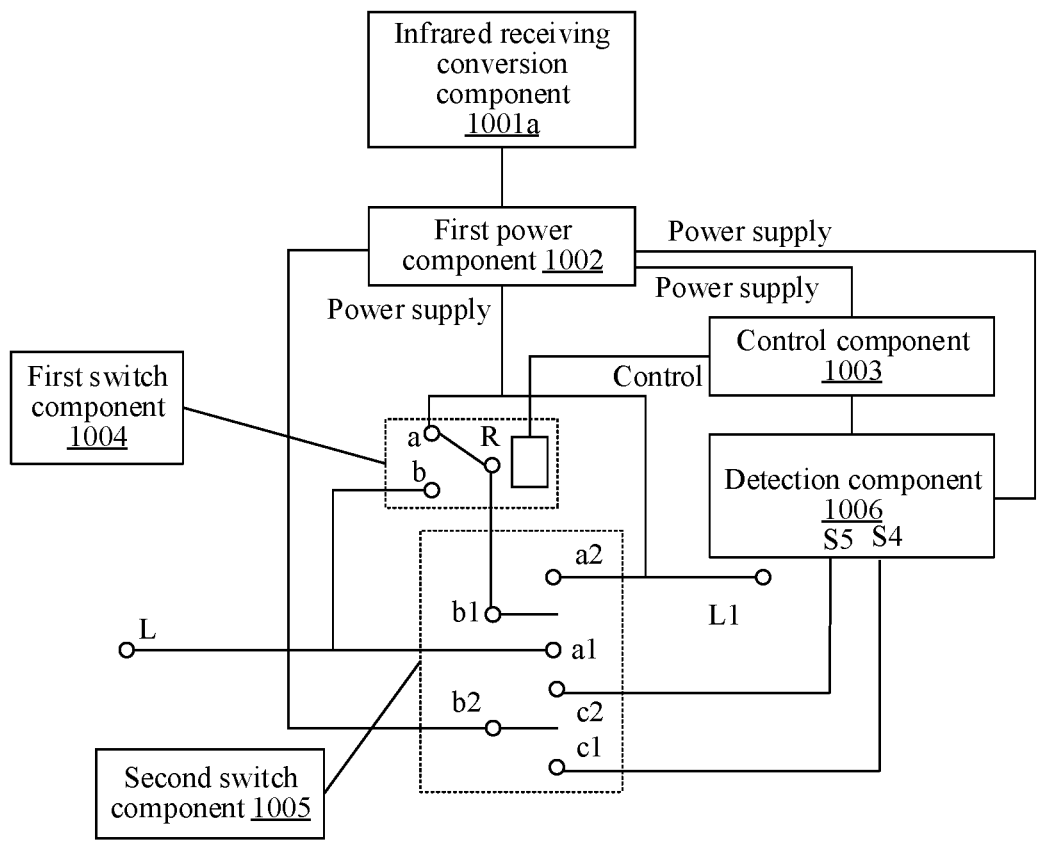
FIG. 9 is a tenth structure diagram of a switch device according to some embodiments of the present disclosure.

In an embodiment, as illustrated in FIG. 9, the switch device 1000 further includes a detection component 1006.

The detection component 1006 is connected to a fixed end (that is, the third fixed sub-end c1 and the fourth fixed sub-end c2) corresponding to the second moving sub-end b2, and is configured to detect a switch state of the second moving sub-end b2.

The control component 1003 is connected to the detection component 1006, and is configured to determine a switch state of the first moving sub-end b1 according to the switch state of the second moving sub-end b2.

In the embodiment of the present disclosure, the switch state of the second moving sub-end b2 and the switch state of the first moving sub-end b1 are both used to represent connection states of the fixed sub-ends cooperating therewith. For example, the switch state of the second moving sub-end b2 is used to represent whether the second moving sub-end b2 is connected to the third fixed sub-end c1 or the fourth fixed sub-end c2, and the switch state of the first moving sub-end b1 is used to represent whether the first moving sub-end b1 is connected to the first fixed sub-end a1 or the second fixed sub-end a2.

It should be noted that the detection component 1006 can detect the switch state of the second moving sub-end b2 by detecting electrical signals of the first input pin S4 and the second input pin S5. For example, when it is detected that the electrical signal of the first input pin S4 is a high-level electrical signal, and the electrical signal of the second input pin S5 is a low level signal, it is indicated that the second moving sub-end b2 and the third fixed sub-end c1 are connected. When it is detected that the electrical signal of the first input pin S4 is a low-level electrical signal, and the electrical signal of the second input pin S5 is a high level signal, it is indicated that the second moving sub-end b2 and the fourth fixed sub-end c2 are connected. Therefore, the switch state of the second moving sub-end b2 can be obtained.

Moreover, since the second moving sub-end b2 has an identical switch state as the first moving sub-end b1, the switch state of the first moving sub-end b1 can be obtained by detecting the switch state of the second moving sub-end b2. For example, when the second moving sub-end b2 is connected to the third fixed sub-end c1, it is indicated that the first moving sub-end b1 is connected to the first fixed sub-end a1. When the second moving sub-end b2 is connected to the fourth fixed sub-end c2, it is indicated that the first moving sub-end b1 is connected to the second fixed sub-end a2. Therefore, the switch state of the first moving sub-end b1 can be obtained.

After the example where the above controlled device is an electric lamp and the electric lamp is controlled to be in the off state, the current switch state of the second switch component 1005 (for example, the double-pole double-throw switch) is detected by the detection component 1006 according to signals at the third fixed sub-end c1 and the fourth fixed sub-end c2, and the detected current switch state is sent to the control component 1003, so that the control component 1003 controls the fixed end to which the moving end R of the first switch component 1004 is connected, thereby controlling the electric lamp to be in the on or off state. Descriptions are not repeated herein.

In an embodiment, the detection component 1006 can also be configured to detect a remote user input and send a wireless control signal to the control component 1003 based on the remote user input, where the wireless control signal includes a user instruction.

Illustratively, the detection component 1006 includes, but is not limited to, a detection component with a Zigbee function, a detection component with a Bluetooth Low Energy (Ble) function, a detection component with a Wireless Fidelity (Wi-Fi) function, and a detection component with an infrared remote-control function.

In an embodiment, the first power component 1002 is further configured to supply power to the detection component 1006.

In an embodiment, the switch device 1000 further includes a switch panel. The switch panel is provided with a panel button corresponding to the second switch component 1005.

It should be noted that a user can operate the button to change the switch state of the second switch component 1005.

Illustratively, the switch panel may be a switch panel with a Type 86 housing.

In an embodiment, the switch panel is an openable cover plate having a buckle structure on one side and a hinged structure on the other side.

In an embodiment, the power storage sub-component 1002b is a rechargeable battery.

Illustratively, the rechargeable battery includes, but is not limited to, a nickel cadmium rechargeable battery, nickel hydrogen rechargeable battery, lithium ion rechargeable battery, lithium polymer rechargeable battery, lithium iron rechargeable battery, and the like.

Figure 10:
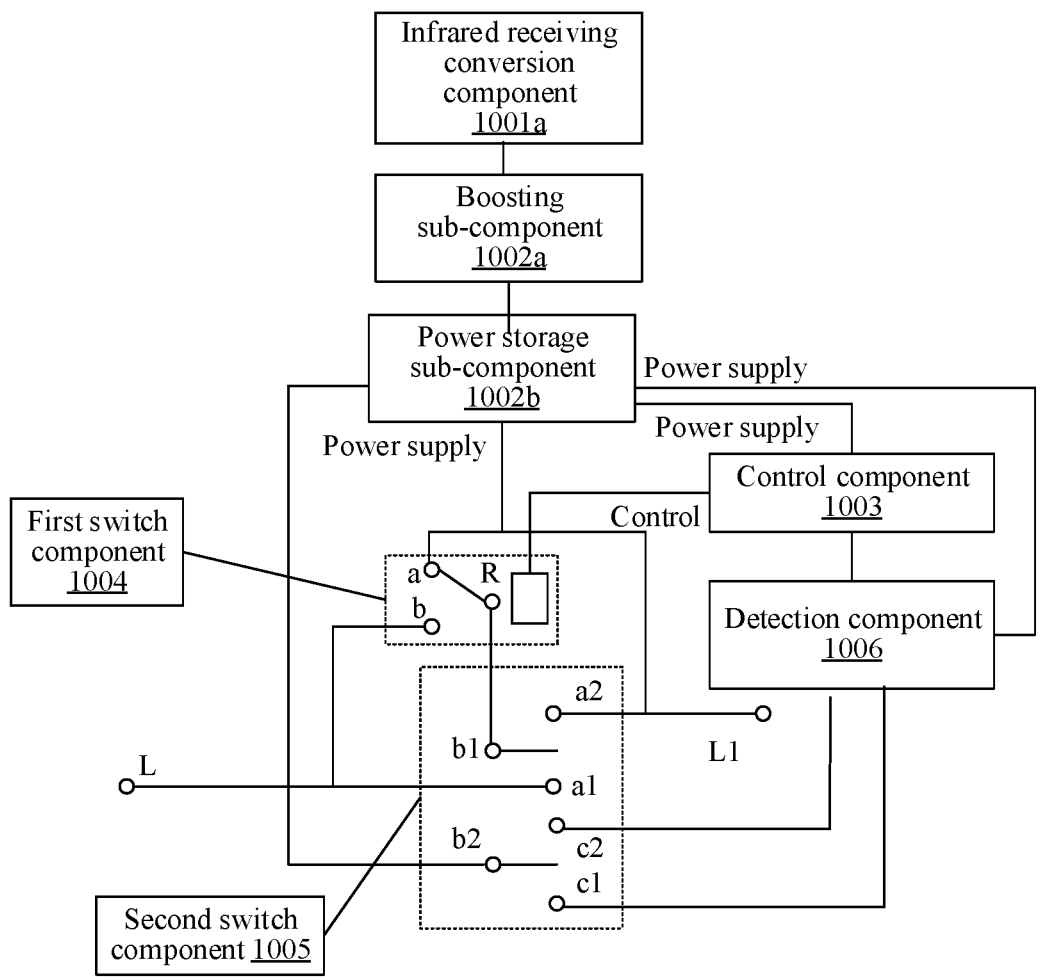
FIG. 10 is an eleventh structure diagram of a switch device according to some embodiments of the present disclosure.

The following is an example of taking an infrared receiving conversion component as the receiving conversion component. As illustrated in FIG. 10, in an embodiment of the present disclosure, a switch device includes: an infrared receiving conversion component 1001a, a boosting sub-component 1002a, a power storage sub-component 1002b, a control component 1003, a first switch component 1004, a second switch component 1005 and a detection component 1006.

The infrared receiving conversion component 1001a is configured to receive an infrared signal, convert the infrared signal into a power supply signal, and output the signal to the boosting sub-component 1002a.

The boosting sub-component 1002a is configured to boost the power supply signal and output the boosted power supply signal to the power storage sub-component 1002b.

The power storage sub-component 1002b is configured to store electrical energy based on the boosted power supply signal and supply power to the control component 1003, the first switch component 1004 and the detection component 1006 based on the electrical energy.

The detection component 1006 is configured to detect a switch state of a second moving sub-end b2 of the second switch component 1005, and send the switch state of the second moving sub-end b2 to the control component 1003.

The control component 1003 is configured to determine a current switch state of a first moving sub-end b1 by using the switch state of the second moving sub-end b2, and output, according to a user instruction included in a wireless signal and the switch state of the first moving sub-end b1, a control signal to the first switch component 1004.

The first switch component 1004 is configured to be in an on state or an off state according to the control signal. The first switch component 1004 is arranged on a power supply loop of a controlled device. When the first switch component 1004 is in the on state, a second power component is configured to supply power to the controlled device.

In the embodiments of the present disclosure, the electrical energy is stored based on the electrical signal converted from the wireless signal, and the stored electrical energy is supplied to the control component. Thus, in the first aspect, it is not necessary to supply power to the switch device by using the single live wire, thereby solving the problem of weak current in a small power switch device caused by power supply of a power supply line (for example, the single live wire), so that there is no limit to the power of the controlled device, and it is universal. In the second aspect, power supplies of the switch device and the controlled device are different, and the safety isolation between the weak current and the strong current is realized. In the third aspect, with the use of a wireless signal transmitter, the power supply of the switch device is not affected by an illumination environment, thereby enabling the switch device to be powered more conveniently and quickly. In another aspect, the switch device controls the power supply loop to be in the on or off state based on a remote user input or an operation on the second switch component, thereby realizing manual control and remote control of the switch device, and improving user experience.

Other embodiments of the invention will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

In some embodiments, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present disclosure is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A smart switch device, comprising:
   a receiving converter, which is configured to receive a wireless signal and convert the received wireless signal into a power supply signal;
   a first power circuit, which is connected to the receiving converter, and is configured to store electrical energy based on the power supply signal and to supply power to a controller and a first switch based on the electrical energy;
   the controller, which is connected to the first power circuit, and is configured to enter a working state based on the electrical energy supplied by the first power circuit, and generate a control signal in the working state; and
   the first switch, which is connected to the controller, and is configured to change to be in an on state of an off state according to the control signal; wherein the first switch is arranged on a power supply loop of a controlled device to which a second power circuit is configured to supply electrical energy in the on state;
   a second switch, which is disposed in series with the first switch on the power supply loop, and is connected to the first switch and the controller respectively;

wherein the second switch is configured to change a switch state according to a user operation on the second switch; and wherein the controller is configured to output the control signal to the first switch according to the switch state of the second switch and the wireless signal including a user instruction;

wherein the first power circuit comprises:

a booster, which is connected to the receiving converter, and is configured to boost the power supply signal; and a power storage, which is connected to the booster, and is configured to store electrical energy based on the boosted power supply signal and supply power to the controller based on the electrical energy.

2. The smart switch device of claim 1, further comprising: a transmitter, which is configured to transmit the wireless signal to the receiving converter.

3. The smart switch device of claim 2, wherein when the transmitter is an infrared transmitter, the receiving converter comprises: an infrared receiving converter which is configured to receive an infrared signal; and when the transmitter is an electromagnetic signal transmitter, the receiving converter comprises: an electromagnetic signal receiving converter which is configured to receive an electromagnetic signal.

4. The smart switch device of claim 1, comprising at least two power supply loops disposed in parallel, wherein each power supply loop comprises the first switch and the second switch.

5. The smart switch device of claim 1, wherein the second switch comprises:

a first moving sub-end, which is connected to a moving end of the first switch; and a second moving sub-end, which is connected to the first power circuit, wherein the first moving sub-end and the second moving sub-end have identical switch states.

6. The smart switch device of claim 5, further comprising:

a detector, which is connected to a fixed end corresponding to the second moving sub-end, and is configured to detect a switch state of the second moving sub-end;

wherein the controller is connected to the detector, and is configured to determine a switch state of the first moving sub-end according to the switch state of the second moving sub-end.

7. The smart switch device of claim 6, wherein the first power circuit is further configured to supply power to the detector.

8. The smart switch device of claim 1, further comprising: a switch panel, which is provided with a panel button corresponding to the second switch.

* * * * *